United States Patent
Wong et al.

(10) Patent No.: US 11,938,777 B1
(45) Date of Patent: Mar. 26, 2024

(54) HEIGHT ADJUSTABLE SHOCK ABSORBER TOP MOUNT

(71) Applicant: GM GLOBAL TECHNOLOGY OPERATIONS LLC, Detroit, MI (US)

(72) Inventors: Victor Wong, Lake Orion, MI (US); Jeffrey Scott Shotwell, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/963,302

(22) Filed: Oct. 11, 2022

(51) Int. Cl.
*B60G 17/027* (2006.01)
*B60G 15/06* (2006.01)

(52) U.S. Cl.
CPC ....... *B60G 17/0272* (2013.01); *B60G 15/061* (2013.01)

(58) Field of Classification Search
CPC .............. B60G 17/0272; B60G 15/061; B60G 2500/30; B60G 2400/25; B60G 2400/252
See application file for complete search history.

(56) References Cited

U.S. PATENT DOCUMENTS

| | | | | |
|---|---|---|---|---|
| 3,829,119 A * | 8/1974 | Kirschner | ............ | B60G 15/063 267/64.19 |
| 4,830,395 A * | 5/1989 | Foley | ................. | B60G 17/0272 280/124.162 |
| 5,024,463 A * | 6/1991 | Oliver | .................. | B60G 17/023 267/260 |
| 5,451,868 A * | 9/1995 | Lock | ......................... | G01P 1/04 324/207.2 |
| 6,126,154 A * | 10/2000 | Shepherd | ................ | F16F 15/04 267/221 |
| 6,902,045 B2 * | 6/2005 | Oliver | .................. | B60G 17/021 267/64.11 |
| 8,702,075 B1 * | 4/2014 | Moorefield | ............. | F16F 1/121 267/221 |
| 2007/0210539 A1 * | 9/2007 | Hakui | .................. | B60G 15/063 280/124.147 |

(Continued)

FOREIGN PATENT DOCUMENTS

DE 3743944 A1 7/1989
DE 19510032 C2 10/1999
(Continued)

OTHER PUBLICATIONS

German Office Action for German Application No. 10 2023 111 307.0 dated Oct. 24, 2023.

Primary Examiner — Frank B Vanaman

(57) ABSTRACT

A height adjustable top mount for adjusting a ride height of a vehicle comprising includes a top plate, a worm wheel, a core, and worm gear. The top plate is configured to mount to a body of the vehicle and movable between a first position and a second position. The worm wheel is received in the top plate and includes an inner wheel surface and an outer wheel surface. The core is received within the worm wheel and helically meshed to the inner wheel surface of the worm wheel. The worm gear is meshed to the outer wheel surface of the worm wheel. Rotation of the worm gear drives rotation of the worm wheel, rotation of the worm wheel simultaneously moves the top plate vertically relative to the core, and movement of the top plate adjusts the ride height of the vehicle in a corresponding direction.

18 Claims, 5 Drawing Sheets

(56) References Cited

U.S. PATENT DOCUMENTS

| | | | | |
|---|---|---|---|---|
| 2010/0295259 A1* | 11/2010 | Ryshavy | ................ | B60G 7/005 |
| | | | | 280/6.15 |
| 2011/0221109 A1* | 9/2011 | Hinouchi | ............. | B60G 15/063 |
| | | | | 267/221 |
| 2015/0224846 A1* | 8/2015 | Kim | ................... | B60G 17/0157 |
| | | | | 280/6.157 |
| 2020/0130451 A1* | 4/2020 | Steinmetz | ................ | F16F 9/56 |

FOREIGN PATENT DOCUMENTS

| | | | | |
|---|---|---|---|---|
| DE | 102008047839 B3 | 7/2010 | | |
| JP | 11-108100 | * | 4/1999 | ........... B60G 17/021 |

* cited by examiner

HEIGHT ADJUSTABLE SHOCK ABSORBER TOP MOUNT

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a device for adjusting a ride height of a vehicle, and more specifically to a height adjustable top mount of a shock absorber.

A vehicle line may include a plurality of trim levels. Each trim level may have a different ride height. During vehicle manufacturing, it may be difficult to achieve the precise ride height for a particular trim level.

Adjusting the ride height of a vehicle after the vehicle is built may be achieved by replacing existing components with new components and scrapping the existing components. For example, one set of shock absorbers may be removed from a vehicle, scrapped, and replaced with a new set of shock absorbers in an attempt to achieve a target right height.

SUMMARY

An example of a height adjustable top mount for adjusting a ride height of a vehicle comprising includes a top plate, a worm wheel, a core, and a worm gear. The top plate is configured to mount to a body of the vehicle and is movable between a first position and a second position. The worm wheel is received in the top plate and includes an inner wheel surface and an outer wheel surface that opposes the inner wheel surface. The core is received within the worm wheel and is helically meshed to the inner wheel surface of the worm wheel. The worm gear is meshed to the outer wheel surface of the worm wheel. Rotation of the worm gear drives rotation of the worm wheel, rotation of the worm wheel simultaneously moves the top plate vertically relative to the core, and movement of the top plate adjusts the ride height of the vehicle in a corresponding direction.

In one example, the inner wheel surface of the worm wheel includes inner threads.

In one example, the core includes outer threads that are helically meshed with the inner threads of the worm wheel.

In one example, the outer wheel surface of the worm wheel includes a plurality of splines.

In one example, the worm gear includes outer gear threads that are meshed with at least one spline of the plurality of splines.

In one example, the core includes a cylindrical body and a flange extending radially outwardly from the body.

In one example, the flange of the core abuts a shock absorber of a vehicle suspension system.

In one example, the flange of the core abuts a helical coil spring of a vehicle suspension system.

In one example, the top plate includes an aperture that is axially aligned with an inner surface of the worm gear.

An example of a suspension system of a vehicle includes a shock absorber and a height adjustable top mount. The shock absorber has a shock boot. The height adjustable top mount is disposed on a vertical top of the shock boot and includes a top plate, a worm wheel, a core, and a worm gear. The top plate is configured to mount to a body of the vehicle. The worm wheel is received in the top plate and includes an inner wheel surface and an outer wheel surface that opposes the inner wheel surface. The core is received within the worm wheel and helically meshed to the inner wheel surface of the worm wheel. The worm gear is meshed to the outer wheel surface of the worm wheel. Rotation of the worm gear drives rotation of the worm wheel, rotation of the worm wheel simultaneously moves the top plate vertically relative to the core, and movement of the top plate adjusts a ride height of the vehicle in a corresponding direction.

In one example, the top plate includes an aperture that is aligned with the worm gear.

In one example, a set screw is positioned within the aperture and configured to restrict rotation of the worm gear.

In one example, rotation of the worm gear in a first direction moves the top plate linearly in a first direction.

In one example, rotation of the worm gear in a second direction opposite the first direction moves the top plate linearly in a second direction that is opposite the first direction.

An example of a suspension system of a vehicle includes a helical coil spring and a height adjustable top mount. The height adjustable top mount is disposed on a vertical top of the helical coil spring and includes a top plate, a worm wheel, a core, and a worm gear. The top plate is configured to mount to a body of the vehicle. The worm wheel is received in the top plate and includes an inner wheel surface and an outer wheel surface that opposes the inner wheel surface. The core is received within the worm wheel and helically meshed to the inner wheel surface of the worm wheel. The worm gear is meshed to the outer wheel surface of the worm wheel. Rotation of the worm gear drives rotation of the worm wheel, rotation of the worm wheel simultaneously moves the top plate vertically relative to the core, and movement of the top plate adjusts a ride height of the vehicle in a corresponding direction.

In one example, the top plate includes an aperture that is aligned with the worm gear.

In one example, a set screw is positioned within the aperture and is configured to restrict rotation of the worm gear.

In one example, the aperture of the top plate and the worm gear is configured to receive a tool attachment.

In one example, rotation of the worm gear in a first direction moves the top plate linearly in a first direction.

In one example, rotation of the worm gear in a second direction opposite the first direction moves the top plate linearly in a second direction that is opposite the first direction.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure provides a height adjustable top mount that can adjust a ride height of a vehicle. The height adjustable top mount described herein enables the correct height adjustment without the need for replacement components and minimizes scrap/waste.

Figure 1:
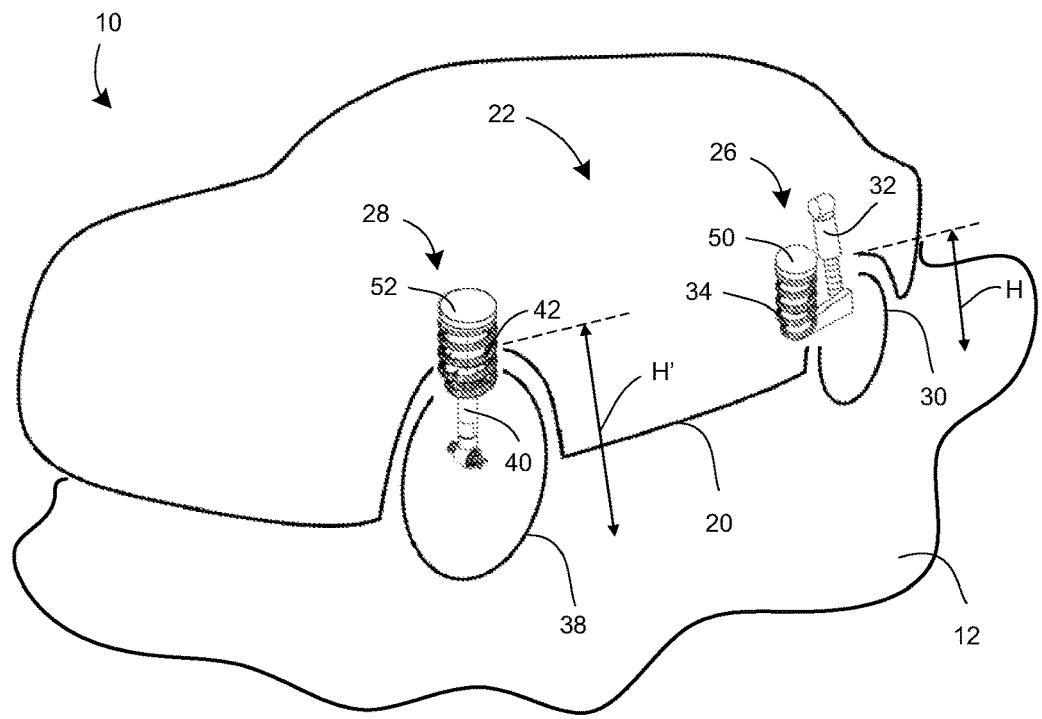
FIG. 1 is a perspective view of a vehicle with a height adjustable top mount for a rear suspension and a front suspension.

With reference to FIG. 1, a vehicle 10 sits on a floor 12. While the vehicle 10 has been depicted as a passenger car, the vehicle 10 may be another suitable type of vehicle. Examples of such vehicles include buses, trucks, off-road vehicles, three-wheelers, all terrain vehicles (ATVs), utility vehicles, motor bikes, and other types of vehicles.

The vehicle 10 may be driven by an internal combustion engine, one or more electric motors, a hybrid/electric powertrain including an engine and one or more electric motors, or another suitable type of torque producer. The vehicle 10 includes a body 20 and a suspension system 22. The suspension system 22 includes a rear suspension 26 and a front suspension 28.

The rear suspension 26 is associated with rear wheels 30. The rear suspension 26 is connected to the body 20 using a pair of shock absorbers 32 and a pair of helical coil springs 34.

Similarly, the front suspension 28 is associated with front wheels 38. The front suspension 28 is connected to the body 20 using a pair of shock absorbers 40 and a pair of helical coil springs 42. In an alternative embodiment, the vehicle 10 may include an independent suspension unit for each of the four corners. The term shock absorbers as used herein may refer to shock absorbers in general may include dampers, McPherson struts, and semi-active and active suspensions.

The suspension system 22 includes one or more height adjustable top mounts that are configured to adjust a ride height of the vehicle 10. The height adjustable top mounts may be disposed on at least one of the helical coil springs 34, 42 of the front or rear suspensions 28, 26 and additionally or alternatively, on at least one of the shock absorbers 32, 40 of the front or rear suspensions 28, 26.

In the illustrated example, the suspension system 22 includes a pair of rear height adjustable top mounts 50 and a pair of front height adjustable top mounts 52. The pair of rear height adjustable top mounts 50 are disposed on top of each of the helical coil springs 34 of the rear suspension 26. The pair of rear height adjustable top mounts 50 are configured to adjust (i.e., raise or lower) a rear ride height H of the vehicle 10, such as measured from the body 20 of the vehicle 10 to the floor 12 at the rear wheel 30.

The pair of front height adjustable top mounts 52 are disposed on top of each of the shock absorbers 40 of the front suspension 28. The pair of front height adjustable top mounts 52 are configured to adjust (i.e., raise or lower) a front ride height H' of the vehicle 10, such as measured from the body 20 of the vehicle 10 to the floor 12 at the front wheel 38.

Figure 2:
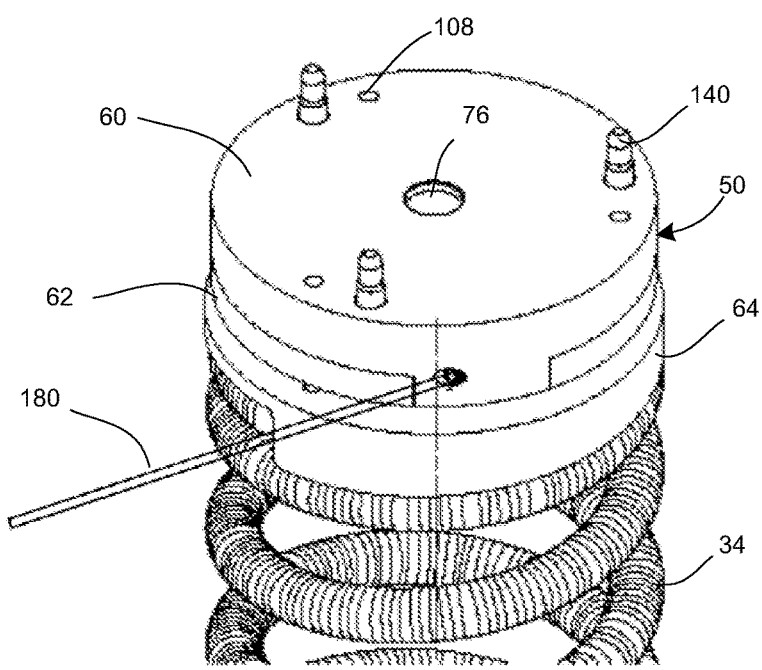
FIG. 2 is a perspective view of the height adjustable top mount of the rear suspension of FIG. 1.
Figure 3:
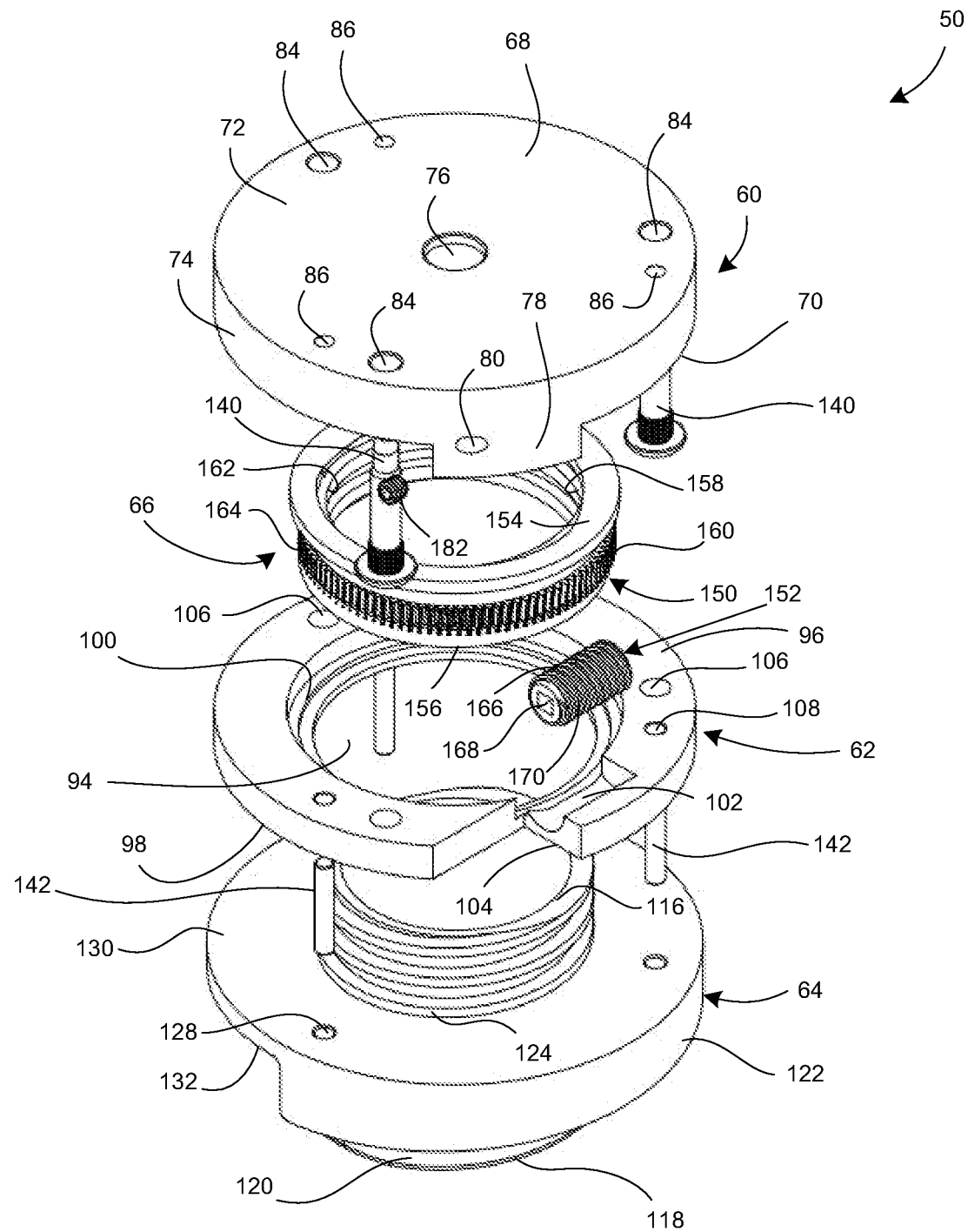
FIG. 3 is an exploded view of the height adjustable top mount of FIG. 2.
Figure 4:
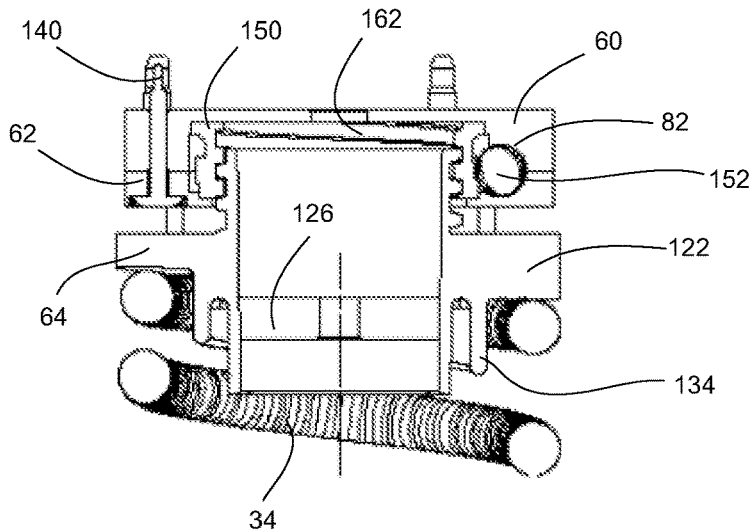
FIG. 4 is a cross-sectional view of the height adjustable top mount of FIG. 2 in a position between a raised position and a lowered position.
Figure 5:
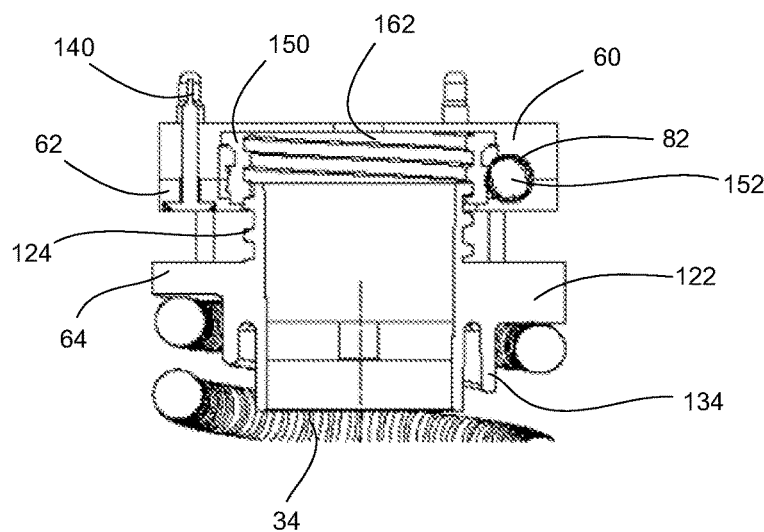
FIG. 5 is a cross-sectional view of the height adjustable top mount of FIG. 2 in the raised position.
Figure 6:
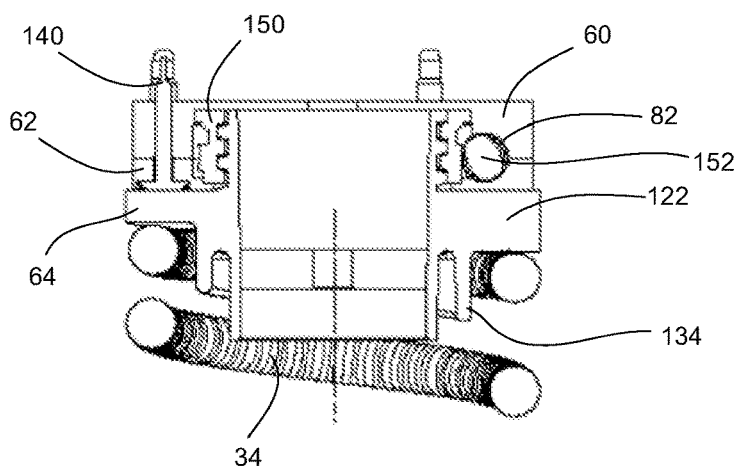
FIG. 6 is a cross-sectional view of the height adjustable top mount of FIG. 2 in the lowered position.

FIG. 2 is a perspective view of the rear height adjustable top mount 50 of the rear suspension 26. FIG. 3 is an exploded view of the rear height adjustable top mount 50. FIG. 4 is a cross-sectional view of the rear height adjustable top mount 50 in a position between a raised position and a lowered position. FIG. 5 is a cross-sectional view of the rear height adjustable top mount 50 in the raised position. FIG. 6 is a cross-sectional view of the rear height adjustable top mount 50 in the lowered position.

With reference to FIGS. 2-6, the rear height adjustable top mount 50 includes a top plate 60, a support plate 62, a core 64, and a gear assembly 66. The top plate 60 includes a first side 68 and a second side 70 that is opposite the first side 68. A recess is formed in the top plate 60 from the second side 70 and extends toward the first side 68. Accordingly, the top plate 60 has a top wall 72 and a sidewall 74 that extends from the top wall 72. The top plate 60 may include a central aperture 76 that is positioned approximately in the middle of the top plate 60.

The sidewall 74 includes a protrusion 78 that extends from the second side 70 and an aperture 80 that extends through the protrusion 78. The sidewall 74 includes a recess 82 that extends from the second side 70 of the top plate 60 and toward the first side 68 of the top plate 60. The recess 82 is positioned adjacent to the protrusion 78.

First apertures 84 may be positioned outboard of (radially outwardly from) the central aperture 76 and be spaced apart from each other. Second apertures 86 may be positioned adjacent to the first apertures 84 and radially outwardly from the central aperture 76. The first and second apertures 84, 86 may extend through the top plate 60 and the sidewall 74. In the illustrated example, the first apertures 84 includes three apertures and the second apertures 86 includes three apertures. However, the first and second apertures 84, 86 may be include a greater or lesser quantity of apertures. Additionally, the first apertures 84 may be greater or lesser in quantity than the second apertures 86. The top plate 60 may be made of a plastic material or another suitable material.

The support plate 62 is secured to the second side 70 of the top plate 60. The support plate 62 includes a central aperture 94 that extends through the support plate 62. Accordingly, the support plate 62 is substantially ring shaped. The support plate 62 includes a first side 96 and a second side 98 that is opposite the first side 96.

The first side 96 of the support plate 62 abuts the second side 70 of the top plate 60. The first side 96 includes a worm wheel seat 100 and a worm gear seat 102 formed as recesses in the support plate 62. The worm wheel seat 100 extends annularly about (around a radially inner edge of) the central aperture 94 of the support plate 62 and is positioned directly adjacent to the central aperture 94. The worm gear seat 102 is positioned directly adjacent to and outboard of (radially outwardly from) the worm wheel seat 100. The worm gear seat 102 is aligned with the recess 82 of the top plate 60 and substantially mirrors the recess 82 of the top plate 60.

Furthermore, the support plate 62 includes a cut-out 104 that is shaped, sized, and positioned to receive the protrusion 78 of the top plate 60. The protrusion 78 extends into the cut-out 104 and side walls of the cut-out 104 contact side walls of the protrusion. The cut-out 104 is positioned adjacent to the worm gear seat 102.

Third apertures 106 extend through the support plate 62 and are aligned with the first apertures 84 of the top plate 60. Fourth apertures 108 extends through the support plate 62 and are aligned with the second apertures 86 of the top plate 60. The support plate 62 may be made of a plastic material or another suitable material.

The core 64 extends between a first end 116 and a second end 118 that is opposite the first end 116. The first end 116 of the core 64 is received within the top plate 60 and extends through the central aperture 94 of the support plate 62. The core 64 is radially spaced apart from the sidewall 74 of the top plate 60 and the worm wheel seat 100 of the support plate 62.

The core 64 includes a body 120 that is substantially cylindrical shaped and a flange 122 that extends radially outwardly from the body 120. The body 120 extends between the first and second ends 116, 118. The body 120 includes outer thread 124 formed in a helical arrangement and positioned between the flange 122 and the first end 116 of the core 64.

A support panel 126 is disposed within the body 120 of the core 64 and positioned near the flange 122. The flange 122 extends annularly about the body 120 and is positioned between the first and second ends 116, 118. The flange 122 includes fifth apertures 128 that are disposed at least partially within the flange 122. The fifth apertures 128 are aligned with the second apertures 86 of the top plate 60 and the fourth apertures 108 of the support plate 62.

The flange 122 is configured to receive and directly contact the vertically upper portion of the helical coil spring 34 of the rear suspension 26. More specifically, the flange 122 includes a top side 130 and a bottom side 132 that is opposite the top side 130. The top side 130 of the flange 122 is substantially flat. The bottom side 132 of the flange 122 is configured to directly contact the top of the helical arrangement of the helical coil spring 34.

Additionally, a lip 134 extends from the bottom side 132 toward the second end 118 of the core 64 and extends annularly about the body 120 of the core 64. The helical coil spring 34 is positioned outboard of (radially outwardly of) the lip 134 and abuts the bottom side 132 of the flange 122. The core 64 may be made of a metal material, such as steel, or another suitable material.

The top plate 60 is mounted to the body 20 of the vehicle 10 using one or more mechanical fasteners 140 that extend through the first and third apertures 84, 106 of the top plate 60 and support plate 62, or in another suitable manner. In the illustrated example, three mechanical fasteners 140 extend from the second side 98 of the support plate 62 and through the first side 68 of the top plate 60 to secure the rear height adjustable top mount 50 to the body 20 of the vehicle 10. For example, the mechanical fasteners 144 may be threaded rods that extend through apertures in the body 20 of the vehicle 10. Bolts may be threaded onto the mechanical fasteners 144 to fix the top plate 60 to the body 20 of the vehicle 10.

Additionally, rods 142 may extend through the second, fourth and fifth apertures 86, 108, 128 of the top plate 60, support plate 62 and core 64 to restrict rotational movement of the top plate 60 or support plate 62 relative to the core 64.

The gear assembly 66 includes a worm wheel 150 and a worm gear 152. The worm wheel 150 and worm gear 152 may be made of a metal material, such as steel, or another suitable material. The worm wheel 150 extends between a first wheel end 154 and a second wheel end 156 that opposes the first wheel end 154. The first wheel end 154 of the worm wheel 150 is positioned within the recess of top plate 60 and abuts the top wall 72 of the top plate 60. The second wheel end 156 of the worm wheel 150 is positioned within the central aperture 94 of the support plate 62 and abuts the worm wheel seat 100 of the support plate 62.

The worm wheel 150 is substantially ring shaped and has an inner surface 158 and an outer surface 160 that is opposite the inner surface 158. The worm wheel 150 includes inner threads 162 disposed at the inner surface 158 and includes splines 164 disposed at the outer surface 160. The inner threads 162 are formed in a helical arrangement and mesh with the outer threads 124 of the core 64. The splines 164 are formed in a vertical or substantially vertical arrangement.

The worm gear 152 is disposed within the recess 82 of the top plate 60 and the worm gear seat 102 of the support plate 62. The worm gear 152 is positioned adjacent to the worm wheel 150. The worm gear 152 includes an outer surface 166 and an inner surface 168 (recess) that is opposite the outer surface 166. The outer surface 166 includes outer threads 170 that are formed in a helical arrangement. The outer threads 170 of the worm gear 152 mesh with at least one spline 164 of the worm wheel 150. In the illustrated example, the inner surface 168 has a square cross-sectional shape. However, the inner surface 168 may have another suitable cross-sectional shape, such as star shaped, hexagonal shaped, etc. The worm gear 152 (the inner surface 168) is axially aligned with the aperture 80 of the top plate 60. In other words, the inner surface 168 can be engaged (e.g., a tool/bit) through the aperture 80.

The operation of the rear height adjustable top mount 50 will now be discussed. The height adjustable top mount 50 is configured to raise and lower the ride height of the vehicle 10 at the location of the height adjustable top mount 50. The rear height adjustable top mount 50 is movable between a raised position (a second position) shown in FIG. 5 and a lowered position (a third position) shown in FIG. 6 to move the body 20 of the vehicle 10 in a corresponding direction and raise or lower the vehicle 10. An example position between the raised and lower positions is illustrated as a nominal position (a first position) in FIG. 4.

A power tool, such as a drill, impact driver, power hand tool, and the like, may be used to actuate the rear height adjustable top mount 50. Specifically, a power tool attachment (e.g., bit) 180 (FIG. 2) of the power tool is inserted through the aperture 80 of the top plate 60 and into the inner surface 168 of the worm gear 152. Accordingly, the power tool attachment 180 abuts the inner surface 168 of the worm gear 152.

The power tool attachment 180 has the same cross-sectional shape as the inner surface 168 of the worm gear 152 such that the power tool attachment 180 is rotatably fixed relative to the worm gear 152. Rotation of the power tool attachment 180 drives rotation of the worm gear 152. In the illustrated example, the power tool attachment 180 has a square cross-sectional shape to match the square cross-sectional shape of the inner surface 168 of the worm gear 152.

Activation of the power tool rotates the power tool attachment 180. Because the power tool attachment 180 is received within the worm gear 152, rotation of the power tool attachment 180 causes corresponding and simultaneous rotation of the worm gear 152. In response, the worm gear 152 rotates the worm wheel 150 as the outer threads 170 of the worm gear 152 are meshed with at least one spline 164 of the worm wheel 150. Simultaneously, the inner threads 162 of the worm wheel 150 rotate relative to the outer threads 124 of the core 64, and thereby moves the worm wheel 150 in an upward or downward direction relative to the core 64. Because the worm wheel 150 is vertically fixed relative to the top plate 60 and the support plate 62, vertical movement of the worm wheel 150 simultaneously moves the top plate 60 and the support plate 62 in a corresponding vertical direction. Movement of the top plate 60 simultaneously moves the body 20 of the vehicle 10 as the top plate 60 is mounted to the body 20 via the mechanical fasteners 140. Accordingly, the rear ride height H of the vehicle 10 is modified such that rotation of the power tool attachment 180 in one direction (e.g., clockwise) raises the rear ride height H and rotation of the power tool attachment 180 in the opposite direction (e.g., counter-clockwise) lowers the rear ride height H.

Furthermore, the rear height adjustable top mount 50 may include a set screw 182 (FIG. 3). The set screw 182 may be inserted through the aperture 80 of the top plate 60 and into the inner surface 168 after the rear ride height H is adjusted to a target ride height. Insertion of the set screw 182 restricts rotation of the worm gear 152 and thereby, restricts further movement of the rear height adjustable top mount 50.

While the rear height adjustable top mount 50 is discussed in conjunction with the rear suspension 26, the rear height adjustable top mount 50 may also be used with the front suspension 28.

Figure 7:
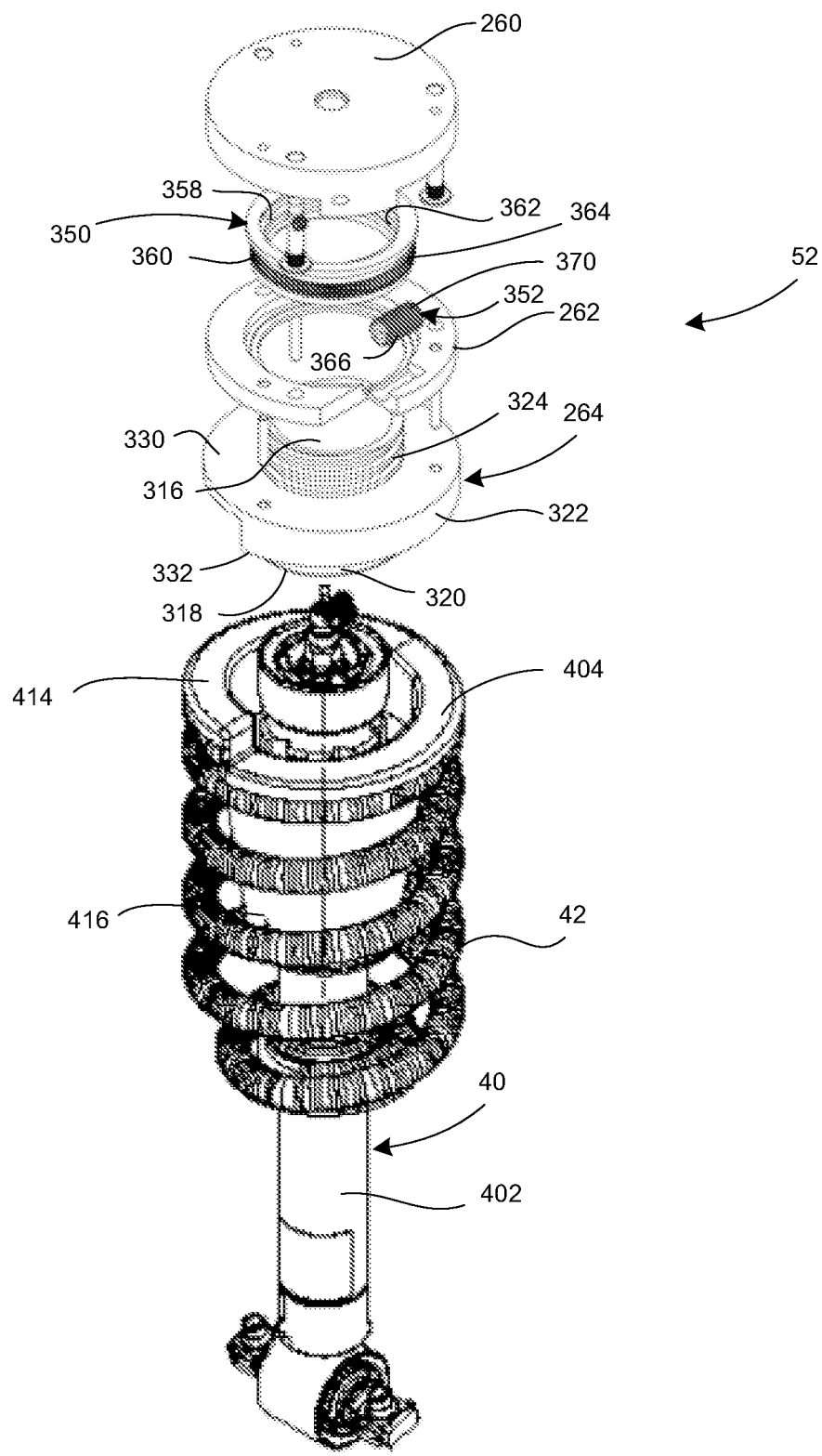
FIG. 7 is an exploded view of the height adjustable top mount of the front suspension.
Figure 8:
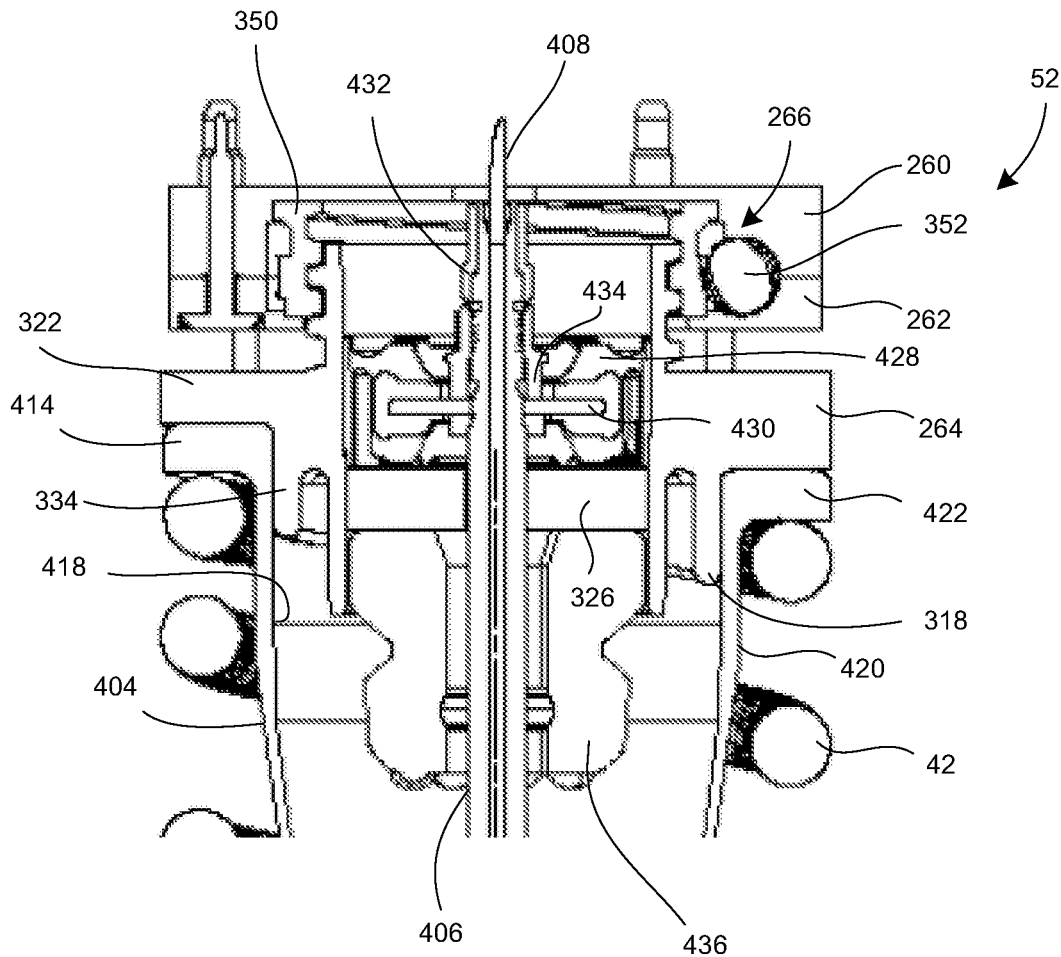
FIG. 8 is an enlarged section view of the height adjustable top mount and shock absorber of FIG. 7.

FIGS. 7-8 illustrate the front height adjustable top mount 52. Many of the elements of the rear height adjustable top mount 50 previously described are the same or substantially the same among the rear and front height adjustable top mounts 50, 52. Accordingly, equivalent elements shared between the rear and front height adjustable top mounts 50, 52 have corresponding reference numbers. For example, reference number 60 in FIGS. 1-6 correspond to reference numeral 260 in FIGS. 7-8. Additionally, the operation of the front height adjustable top mount 52 to adjust the front ride height H' is the same as the operation of the rear height adjustable top mount 50 to adjust the rear ride height H. Thus, the operation of the front height adjustable top mount 52 will not be re-described.

Like the rear height adjustable top mount 50, the front height adjustable top mount 52 includes a top plate 260 that is configured to mount to the body 20 of the vehicle 10, a support plate 262 positioned below the top plate 260, a core 264 received in the top plate 260 and support plate 262, and a gear assembly 266 that is operable to move the front height adjustable top mount 52 between a raised position and a lowered position. The core 264 extends between a first end 316 and a second end 318 that is opposite the first end 316. The core 264 includes a body 320 that is formed substantially in a cylindrical shape and a flange 322 that extends radially outwardly from the body 320. The body 320 includes outer thread 324 that is formed in a helical arrangement and positioned between the flange 322 and the first end 316 of the core 264. A support panel 326 is disposed within the body 320 and positioned near the flange 322. The flange 322 includes a top side 330 and a bottom side 332 that is opposite the top side 330. A lip 334 extends from the bottom side 332 and toward the second end 318 of the core 264 and extends annularly about the body 320 of the core 264. The gear assembly 266 includes a worm wheel 350 disposed annularly about the outer thread 324 of the core 264 and a worm gear 352 that meshes with the worm wheel 350. The worm wheel 350 includes inner thread 362 disposed at an inner surface 358 of the worm wheel 350 and includes splines 364 disposed at an outer surface 360 of the worm wheel 350. The inner thread 362 are formed in a helical arrangement and mesh with the outer thread 324 of the core 264. The worm gear 352 includes outer thread 370 disposed at an outer surface 366 and formed in a helical arrangement.

The front height adjustable top mount 52 is attached to the shock absorber of the front suspension 28. The shock absorber 40 includes a shock body 402 housing a piston and includes a shock boot 404 disposed between the flange 322 of the core 264 and the shock body 402. A piston rod 406 is attached to the piston and extends from the shock body 402, through the shock boot 404 and core 264 and to the top plate 260. The piston rod 406 includes a wire 408 that extends through the top plate 260.

The shock boot 404 extends between a first end 414 and a second end 416 that is opposite the first end 414. Additionally, the shock boot 404 includes an inner surface 418 and an outer surface 420 that is opposite the inner surface 418. The first end 414 of the shock boot 404 includes a flange 422 that is configured to directly contact the bottom side 332 of the flange 322. Additionally, the inner surface 418 of the shock boot 404 abuts the lip 334 of the core 264. The helical coil spring 42 of the front suspension 28 abuts the flange 422 and extends helically about the shock boot 404. Accordingly, the flange 422 of the shock boot 404 is configured to directly contact the top of the helical arrangement of the helical coil spring 42.

A first isolator 428 is disposed within the core 264 and positioned between the support panel 326 and the first end 316 of the core 264. More specifically, the first isolator 328 abuts the support panel 326 and extends annularly about the piston rod 406. A shock rod 430 extends transversely through the piston rod 406 and is received within opposing sides of the first isolator 428. Additionally, a first nut 432 and a second nut 434 are disposed annularly about the piston rod 406 and are positioned between the shock rod 430 and the top plate 260. More specifically, the first nut 432 is positioned adjacent to the top plate 260 and the second nut 434 is positioned between the first nut 432 and the shock rod 430. Furthermore, a second isolator 436 is disposed within the shock boot 404 and positioned at the second end 318 of the core 264. The second isolator 436 abuts the support panel 326 of the core 264 and extends annularly about the piston rod 406.

Advantageously, the rear and front height adjustable top mounts 50, 52 allow for adjustment of a rear and front ride height H, H' of the vehicle 10 while the vehicle 10 remains on the floor 12, such as before the vehicle 10 leaves vehicle manufacturing. The placement of the rear and front height adjustable top mounts 50, 52 allows for easy access to the rear and front height adjustable top mounts 50, 52 from outside the vehicle 10. Furthermore, the operation does not require removing or replacing any components of the suspension system 22. For example, the helical coil springs 34, 42 need not be removed and replaced with new helical coil springs 34, 42 to adjust vehicle ride height.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A height adjustable top mount for adjusting a ride height of a vehicle comprising:
    a top plate configured to mount to a body of the vehicle and movable between a first position and a second position;
    a worm wheel received in the top plate and including an inner wheel surface and an outer wheel surface that opposes the inner wheel surface;
    a core received within the worm wheel and helically meshed to the inner wheel surface of the worm wheel;
    a worm gear meshed to the outer wheel surface of the worm wheel,
    wherein rotation of the worm gear drives rotation of the worm wheel, rotation of the worm wheel simultaneously moves the top plate vertically relative to the core, and movement of the top plate adjusts the ride height of the vehicle in a corresponding direction,
    wherein the top plate includes an aperture that is aligned with the worm gear; and
    a set screw positioned within the aperture and configured to restrict rotation of the worm gear.

2. The height adjustable top mount of claim 1, wherein the inner wheel surface of the worm wheel includes inner threads.

3. The height adjustable top mount of claim 2, wherein the core includes outer threads that are helically meshed with the inner threads of the worm wheel.

4. The height adjustable top mount of claim 1, wherein the outer wheel surface of the worm wheel includes a plurality of splines.

5. The height adjustable top mount of claim 4, wherein the worm gear includes outer gear threads that are meshed with at least one spline of the plurality of splines.

6. The height adjustable top mount of claim 1, wherein the aperture of the top plate is axially aligned with an inner surface of the worm gear.

7. The height adjustable top mount of claim 1, wherein the core includes a cylindrical body and a flange extending radially outwardly from the cylindrical body.

8. The height adjustable top mount of claim 7, wherein the flange of the core abuts a shock absorber of a vehicle suspension system.

9. The height adjustable top mount of claim 7, wherein the flange of the core abuts a helical coil spring of a vehicle suspension system.

10. A suspension system of a vehicle comprising:
    a shock absorber having a shock boot; and
    a height adjustable top mount disposed on a vertical top of the shock boot and including:
        a top plate configured to mount to a body of the vehicle;
        a worm wheel received in the top plate and including an inner wheel surface and an outer wheel surface that opposes the inner wheel surface;
        a core received within the worm wheel and helically meshed to the inner wheel surface of the worm wheel, wherein the core is mounted to the shock boot; and
        a worm gear meshed to the outer wheel surface of the worm wheel,
        wherein rotation of the worm gear drives rotation of the worm wheel, rotation of the worm wheel simultaneously moves the top plate vertically relative to the core, and movement of the top plate adjusts a ride height of the vehicle in a corresponding direction.

11. The suspension system of claim 10, wherein the top plate includes an aperture that is aligned with the worm gear.

12. The suspension system of claim 11, further comprising a set screw positioned within the aperture and configured to restrict rotation of the worm gear.

13. The suspension system of claim 10, wherein rotation of the worm gear in a first direction moves the top plate linearly in a first direction.

14. The suspension system of claim 13, wherein rotation of the worm gear in a second direction opposite the first direction moves the top plate linearly in a second direction that is opposite the first direction.

15. A suspension system of a vehicle comprising:
    a helical coil spring; and
    a height adjustable top mount disposed on a vertical top of the helical coil spring and including:
        a top plate configured to mount to a body of the vehicle;
        a worm wheel received in the top plate and including an inner wheel surface and an outer wheel surface that opposes the inner wheel surface;
        a core received within the worm wheel and helically meshed to the inner wheel surface of the worm wheel, wherein the core includes a cylindrical body and a flange extending radially outwardly from the cylindrical body, and wherein the flange of the core abuts the helical coil spring;
        a worm gear meshed to the outer wheel surface of the worm wheel,
        wherein rotation of the worm gear drives rotation of the worm wheel, rotation of the worm wheel simultaneously moves the top plate vertically relative to the core, and movement of the top plate adjusts a ride height of the vehicle in a corresponding direction,
        wherein the top plate includes an aperture that is aligned with the worm gear; and
        a set screw positioned within the aperture and configured to restrict rotation of the worm gear.

16. The suspension system of claim 15, wherein the aperture of the top plate and the worm gear is configured to receive a tool attachment.

17. The suspension system of claim 15, wherein rotation of the worm gear in a first direction moves the top plate linearly in a first direction.

18. The suspension system of claim 17, wherein rotation of the worm gear in a second direction opposite the first direction moves the top plate linearly in a second direction that is opposite the first direction.

* * * * *